United States Patent
Starling et al.

(10) Patent No.: US 6,609,078 B2
(45) Date of Patent: Aug. 19, 2003

(54) FOOD QUALITY AND SAFETY MONITORING SYSTEM

(75) Inventors: Neal Starling, Canton, GA (US); Paul Wickberg, Marietta, GA (US); Abtar Singh, Kennesaw, GA (US); Thomas J. Mathews, Fayette, ME (US)

(73) Assignee: Emerson Retail Services, Inc., Kennesaw, GA (US)

( * ) Notice: Subject to any disclaimer, the term of this patent is extended or adjusted under 35 U.S.C. 154(b) by 0 days.

(21) Appl. No.: 09/790,141

(22) Filed: Feb. 21, 2001

(65) Prior Publication Data

US 2002/0161545 A1 Oct. 31, 2002

(51) Int. Cl.⁷ .............................................. G01K 13/00

(52) U.S. Cl. ..................................................... 702/130

(58) Field of Search ...................... 702/130, 27; 62/203; 364/550; 426/23, 123.3, 607; 219/385; 99/467; 600/345

(56) References Cited

U.S. PATENT DOCUMENTS 5,440,894 A * 8/1995 Schaeffer et al. ............. 62/203
5,754,449 A * 5/1998 Hoshal et al. ............... 364/550

* cited by examiner

*Primary Examiner*—John Barlow
*Assistant Examiner*—Tung S Lau
(74) *Attorney, Agent, or Firm*—Harness, Dickey & Pierce, P.L.C.

(57) ABSTRACT

The present invention provides a food quality and safety monitoring system and method for evaluating food characteristic management for improving the safety of perishable food products for human consumption and the shelf life of perishable food product. In a first embodiment, a temperature sample is taken for each product group within a refrigeration case that is used to calculate either a food safety index or a food quality index. Alternatively, the food product temperature for each food product group within a refrigeration case may be continuously monitored to calculate a food characteristic index. The food characteristic index can be monitored over time to evaluate the food characteristic management of a particular store or group of stores.

50 Claims, 5 Drawing Sheets

FOOD QUALITY AND SAFETY MONITORING SYSTEM

FIELD OF THE INVENTION

The present invention generally relates to monitoring food quality and safety standards and, more particularly, to a system and methods for determining food quality and safety indices for monitoring stored food products.

SUMMARY OF THE INVENTION

The present invention provides a method for evaluating food characteristic management performance of a food manager such as a chain of food product retailers, a food product retailer within a chain of food product retailers, a food product department within a food product retailer, a food product storage case within a department of a food product retailer, or the like. The method comprises the steps of: collecting first product data from a first food manager, determining a first food characteristic index as a function of said first product data for said first food manager, collecting second product data from a second food manager, determining a second food characteristic index as a function of said second product data for said second food manager, and comparing said first food characteristic index and said second food characteristic index.

The present invention further provides a method for determining a food characteristic index for a plurality of product types contained within a plurality of refrigeration cases. The method includes the steps of: measuring a first parameter of each of the plurality of product types within the plurality of refrigeration cases, determining a second parameter for each of the plurality of refrigeration cases as a function of the first parameter, determining a third parameter for each of the plurality of refrigeration cases, determining a first parameter threshold value for each of the plurality of product types, calculating a first factor for each of the plurality of refrigeration cases as a function of the second parameter, the third parameter and the first parameter threshold value, calculating an average value of the first factors of the plurality of refrigeration cases, determining a maximum value of the first factors of the plurality of refrigeration cases and calculating the food characteristic index as a function of the maximum value and the average value of the first factors.

In a first exemplary embodiment, the food characteristic index is a food safety index for evaluating the potential health threat refrigerated foods may pose to consumers. In a second exemplary embodiment, the food product index is a food quality index for evaluating the aesthetic quality of food products for maximizing the shelf life of food products.

DETAILED DESCRIPTION OF THE PREFERRED EMBODIMENT

The following description of the preferred embodiments concerning a method for determining food safety and food quality indices is merely exemplary in nature and is not intended to limit the invention, its application or uses. Moreover, while the present invention is discussed in detail below, with respect to specific types of hardware, the present invention may be employed with other types of hardware which are operable to be configured to provide substantially the same results as discussed herein.

Figure 1:
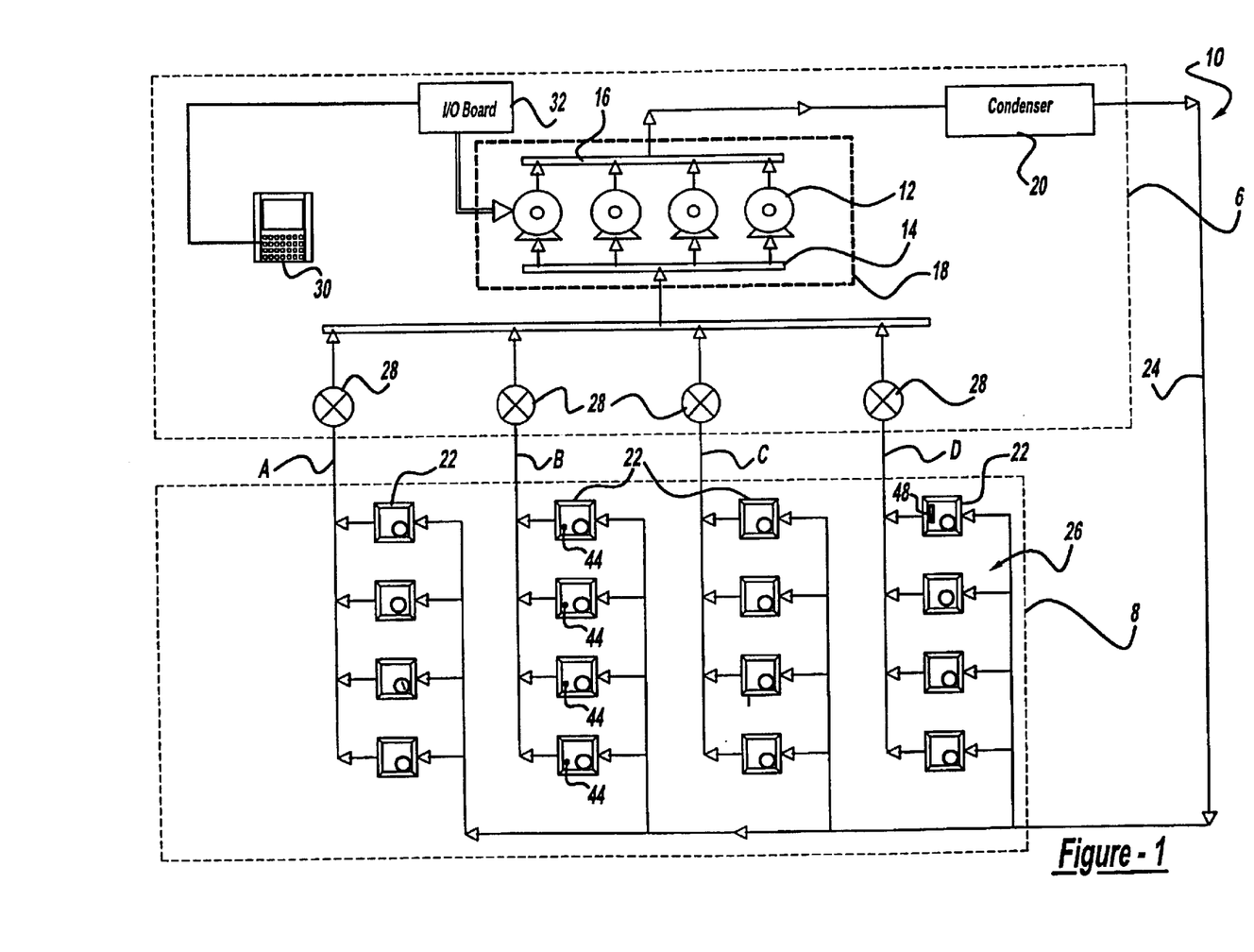
FIG. 1 is a schematic view of a food product refrigeration system according to the principles of the present invention.
Figure 2:
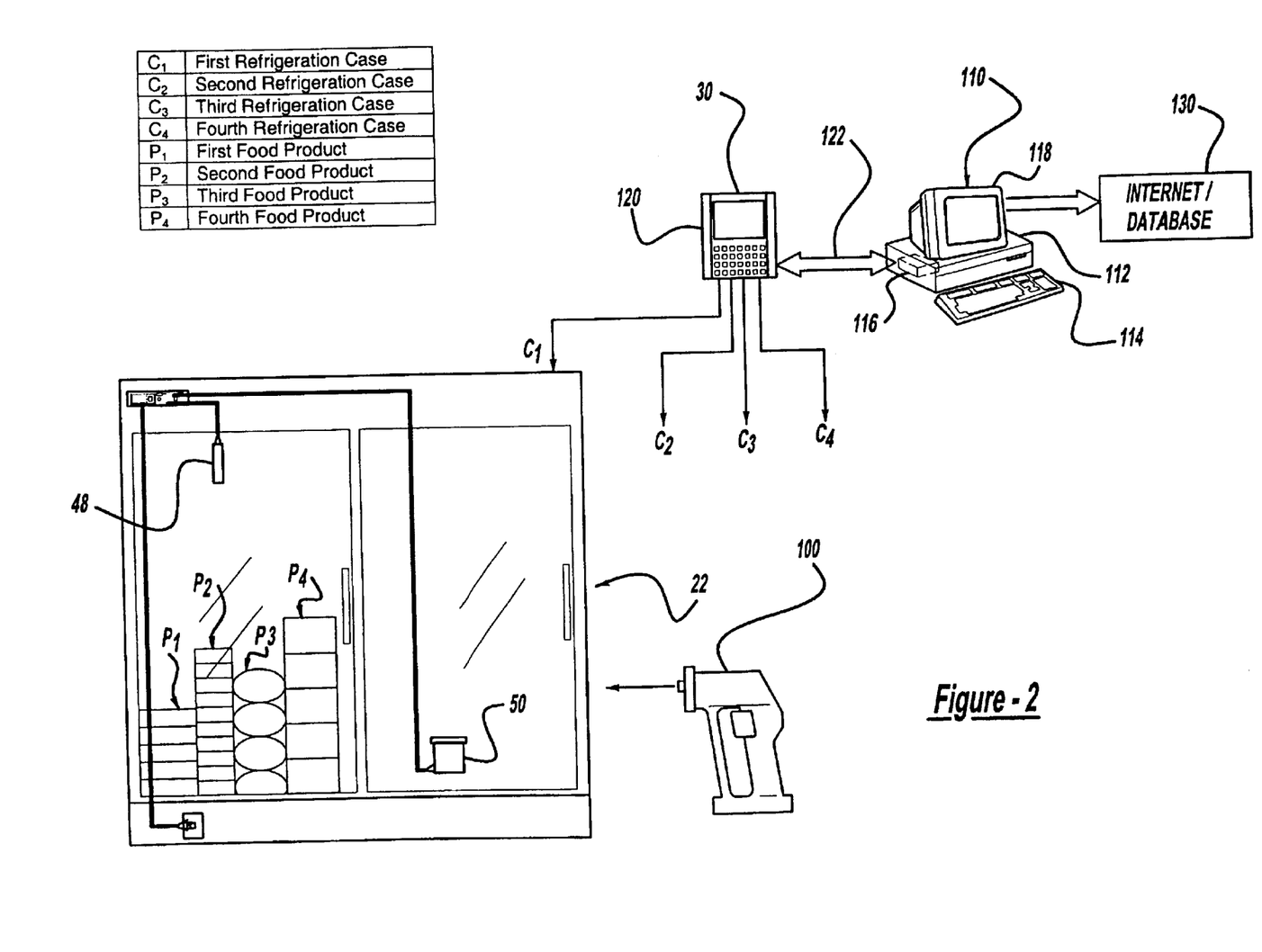
FIG. 2 is a schematic view of a refrigeration case of the food product refrigeration system having food product and a food product simulator therein.

Referring to FIGS. 1 and 2, a detailed block diagram of an exemplary refrigeration system 10 is shown. The refrigeration system 10 includes a plurality of compressors 12 piped together with a common suction manifold 14 and a discharge header 16 all positioned within a compressor rack 18. The compressor rack 18 compresses refrigerant vapor that is delivered to a condenser 20 where the refrigerant vapor is liquefied at high pressure. This high-pressure liquid refrigerant is delivered to a plurality of refrigeration cases 22 by way of piping 24. Each refrigeration case 22 is arranged in separate circuits 26 consisting of a plurality of refrigeration cases 22 that operate within a certain temperature range. FIG. 1 illustrates four (4) circuits 26 labeled circuit A, circuit B, circuit C and circuit D. Each circuit 26 is shown consisting of four (4) refrigeration cases 22. However, those skilled in the art will recognize that any number of circuits 26, as well as any number of refrigeration cases 22 may be employed within a circuit 26. As indicated, each circuit 26 will generally operate within a certain temperature range. For example, circuit A may be for frozen food, circuit B may be for dairy, circuit C may be for meat, etc.

Since the temperature requirement is different for each circuit 26, each circuit 26 includes a pressure regulator 28 which acts to control the evaporator pressure and, hence, the temperature of the refrigerated space in the refrigeration cases 22. The pressure regulators 28 can be electronically or mechanically controlled. Each refrigeration case 22 also includes its own evaporator and its own expansion valve that may be either a mechanical or an electronic valve for controlling the superheat of the refrigerant. In this regard, refrigerant is delivered by piping to the evaporator in each refrigeration case 22. The refrigerant passes through an expansion valve where a pressure drop causes the high pressure liquid refrigerant to become a lower pressure combination of liquid and vapor. As the hot air from the refrigeration case 22 moves across the evaporator coil, the low pressure liquid turns into gas. This low pressure gas is delivered to the pressure regulator 28 associated with that particular circuit 26. At the pressure regulator 28, the pressure is dropped as the gas returns to the compressor rack 18. At the compressor rack 18, the low pressure gas is again compressed to a high pressure gas, which is delivered to the condenser 20, which creates a high pressure liquid to supply to the expansion valve and start the refrigeration cycle over.

A main refrigeration controller 30 is used and configured or programmed to control the operation of the refrigeration system 10. The refrigeration controller 30 is preferably an Einstein Area Controller offered by CPC, Inc. of Atlanta, Ga., or any other type of programmable controller which may be programmed, as discussed herein. The refrigeration controller 30 controls the bank of compressors 12 in the compressor rack 18, via an input/output module 32. The input/output module 32 has relay switches to turn the compressors 12 on an off to provide the desired suction pressure. A separate case controller, such as a CC-100 case controller, also offered by CPC, Inc. of Atlanta, Ga. may be used to control the superheat of the refrigerant to each refrigeration case 22, via an electronic expansion valve in each refrigeration case 22 by way of a communication network or bus 34. Alternatively, a mechanical expansion valve may be used in place of the separate case controller. Should separate case controllers be utilized, the main refrigeration controller 30 may be used to configure each separate case controller, also via the communication bus 34. The communication bus 34 may either be a RS-485 communication bus or a LonWorks Echelon bus that enables the main refrigeration controller 30 and the separate case controllers to receive information from each case 22.

Each refrigeration case may have a temperature sensor 44 associated therewith, as shown for circuit B. The temperature sensor 44 can be electronically or wirelessly connected to the controller 30 or the expansion valve for the refrigeration case. Each refrigeration case 22 in the circuit B may have a separate temperature sensor 44 to take average/min/max temperatures or a single temperature sensor 44 in one refrigeration case 22 within circuit B may be used to control each case 22 in circuit B because all of the refrigeration cases in a given circuit operate at substantially the same temperature range. These temperature inputs are preferably provided to the analog input board 38, which returns the information to the main refrigeration controller via the communication bus 34.

Generally, bacteria that pose a threat to human health are referred to as "pathogen" bacteria and grow quickly when the temperature of their host product rises above a certain threshold temperature. For example, 41° F. is recognized industry-wide as the temperature below which most pathogens grow slowly and below which perishable food products should be stored. In a first exemplary embodiment, as outlined in FIG. 3, the food characteristic index is a food safety index (FSI) for a refrigeration system, such as the refrigeration system 10 described hereinabove. The FSI of the present invention corresponds to bacterial risk levels and provides a method for relative risk evaluation.

Figure 3:
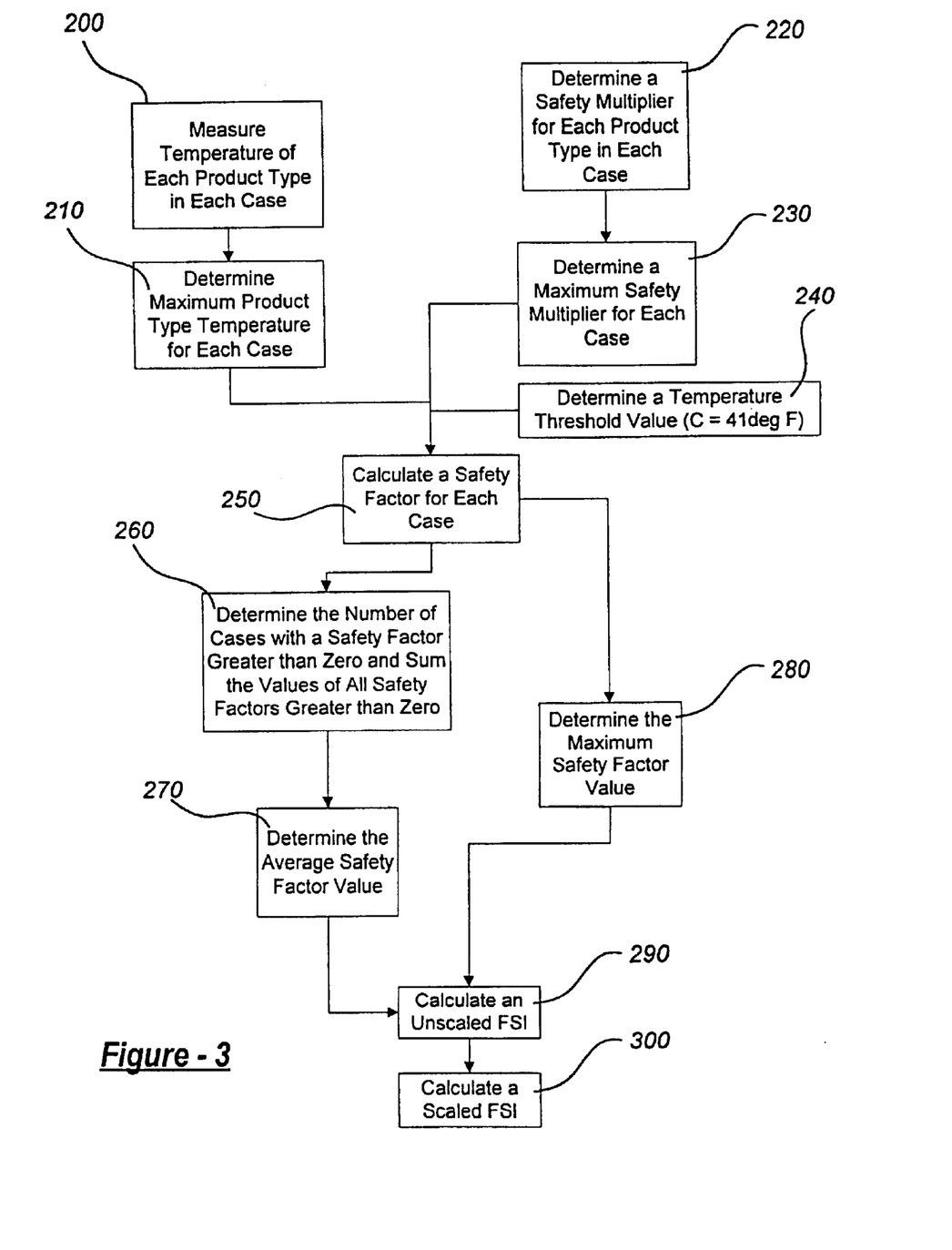
FIG. 3 is a flowchart outlining a method for calculating a food safety index.

Initially, at step 200, the temperature of a product sample from each of the product groups ($P_1, P_2, \ldots, P_j$) will be measured in each of the cases 22 ($C_1, C_2, \ldots, C_i$) (see FIG. 2). Thus, a temperature matrix is formed accounting for a sample of each of the products in each of the cases:

| | | | | |
|---|---|---|---|---|
| $C_1$: | $T_{11}$ | $T_{12}$ | ... | $T_{1j}$ |
| $C_2$: | $T_{21}$ | $T_{22}$ | ... | $T_{2j}$ |
| $C_i$: | $T_{i1}$ | $T_{i2}$ | ... | $T_{ij}$ |

After the product temperatures are measured, the maximum product temperature is determined for each case ($C_1, C_2, \ldots, C_i$), at step 210, as follows:

$$MAX(T_{11}, T_{12}, \ldots, T_{1j})=T_{1MAX}$$
$$MAX(T_{21}, T_{22}, \ldots, T_{2j})=T_{2MAX}$$
$$MAX(T_{i1}, T_{i2}, \ldots, T_{ij})=T_{iMAX}$$

Each food product ($P_1, P_2, \ldots, P_j$) has an associated safety multiplier ($S_1, S_2, \ldots, S_j$). The multipliers ($S_1, S_2, \ldots, S_j$), designated at step 220, are based on the likelihood of product contamination by pathogen bacteria and its ability to support growth scientifically developed and experimentally confirmed micro-organism growth equations. By using the multipliers ($S_1, S_2, \ldots, S_j$) bacterial growth risks are factored into the FSI calculation. At step 230, the maximum safety multiplier value for the products ($P_1, P_2, \ldots, P_j$) within each case ($C_1, C_2, \ldots, C_i$) is determined as follows:

$$MAX(S_{11}, S_{12}, \ldots, S_{1j})=S_{1MAX}$$
$$MAX(S_{21}, S_{22}, \ldots, S_{2j})=S_{2MAX}$$
$$MAX(S_{i1}, S_{i2}, \ldots, S_{ij})=S_{iMAX}$$

Having determined both the maximum temperature and the maximum multiplier for the products ($P_1, P_2, \ldots, P_j$) in each case ($C_1, C_2, \ldots, C_i$), and a threshold temperature at step 240, a safety factor SF for each case ($C_1, C_2, \ldots, C_i$) is calculated at step 250. The calculation of the safety factor SF is determined by comparing the maximum temperature value to the threshold value C (41° F.), described above. The following logic governs the calculation:

For n=1 to i: If ($T_{nMAX}>C$) then $SF_n=(T_{nMAX}-C)S_{nMAX}$, else $SF_n=0$

As a result, safety factors $SF_1, SF_2$, to $SF_i$ are calculated.

Bacteria populations and disease risk are a function of both the frequency and severity of over-temperature product conditions. Biological growth rates increase non-linearly, as a product warms past 41° F. For example, a product at 51° F. is more likely to host large colonies of toxic bacteria than a product at 44° F. However, there may be as much risk from having the product in twenty cases at 44° F. than in a single case at 51° F. To account for this variation, an average safety factor $SF_{AVG}$ and a maximum safety factor $SF_{MAX}$ are used.

Having determined a safety factor for each case of the refrigeration system, secondary parameters B and R are subsequently calculated at step 260. The secondary parameter B is equal to the number of cases having a safety factor greater than zero and R is equal to the sum of all of the safety factors greater than zero. At step 270, secondary parameters B and R are used to calculate the average safety factor $SF_{AVG}$, as follows:

$$SF_{AVG}=R/B$$

The maximum safety factor value $SF_{MAX}$ among the cases ($C_1, C_2, \ldots, C_i$) is determined at step 280. The maximum safety factor value is given as follows:

$$SF_{MAX}=MAX(SF_1, SF_2, \ldots, SF_i)$$

Using the average safety factor $SF_{AVG}$ and the maximum safety factor $SF_{MAX}$, an unscaled FSI is calculated at step 290 as follows:

$$FSI_{UNSCALED}=SQRT[(SF_{MAX})^2+(SF_{AVG})^2]$$

A least squares averaging technique is used to limit the impact of either the $SF_{AVG}$ or $SF_{MAX}$ values that would otherwise affect judgment about how overall risk increases from the combination of the values.

Finally, at step 300, $FSI_{UNSCALED}$ is scaled between 0 and 100 as follows:

$$FSI_{SCALED}=100[(1-FSI_{UNSCALED})/FSI_{MAX}]$$

$FSI_{MAX}$ is equal to the FSI for all $T_{MAX}=51°$ F. $T_{MAX}=51°$ F. is a preselected value and deemed the worst case. This value, however, may vary depending upon historical data that shows a specific worst case value for a particular refrigeration system.

The FSI is a relative risk evaluation determined against a single temperature threshold value, 41° F. The FSI value provides a relative risk measurement of contamination and growth of biological contaminants (i.e., pathogen bacteria), as opposed to contamination and growth of biological contaminants only capable of causing product degradation. The FSI value does not reflect the amount of product in a case or the number of cases in a particular store. As a result the FSI determination uses worst case values to provide a conservative valuation of food safety risk and to minimize the possibility of an undetected food safety problem.

Figure 4:
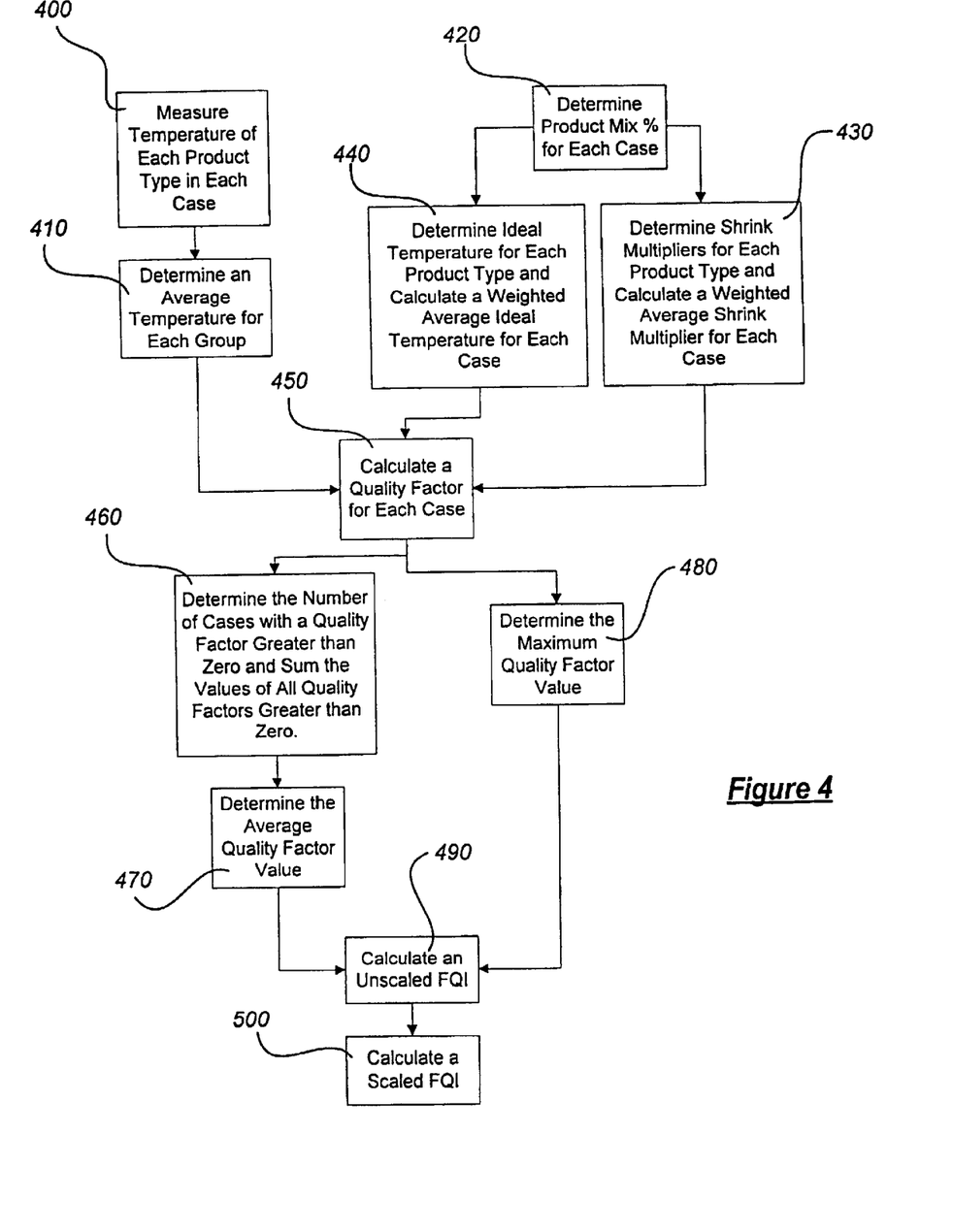
FIG. 4 is a flowchart outlining a method for calculating a food quality index.

Generally, bacteria that diminish the quality (color, smell, etc.) of a food product are referred to as "spoiler" bacteria and have growth rates that vary from product to product. Spoiler bacteria generally grow more quickly than pathogen bacteria. Thus, a food product's quality may appear to be of poor color or smell but still be safe for human consumption. With reference to FIG. 4, the food characteristic index is a food quality index FQI. The FQI is determined using more strict criteria than the FSI in order to keep each product group P as close to the temperature at which it will remain in the best condition (i.e., have the best quality characteristics) as long as possible. This temperature varies from product to product and is generally below the threshold food safety value of 41° F.

Initially, at step 400, the temperature of each of the product groups $(P_1, P_2, \ldots, P_j)$ will be measured in each of the cases $(C_1, C_2, \ldots, C_i)$ (see FIG. 2). Thus, a temperature matrix is formed accounting for all of the products in all of the cases:

| | | | | |
|---|---|---|---|---|
| $C_1$: | $T_{11}$ | $T_{12}$ | ... | $T_{1j}$ |
| $C_2$: | $T_{21}$ | $T_{22}$ | ... | $T_{2j}$ |
| $C_i$: | $T_{i1}$ | $T_{i2}$ | ... | $T_{ij}$ |

After the product temperatures are measured, the average temperature for each product group P within each case C is determined at step 410.

$$T_{1AVG} = AVG(T_{11}, T_{12}, \ldots, T_{1j})$$

$$T_{2AVG} = AVG(T_{21}, T_{22}, \ldots, T_{2j})$$

$$T_{iAVG} = AVG(T_{i1}, T_{i2}, \ldots, T_{ij})$$

Each product P is associated with a shrink multiplier Q. The shrink multiplier Q is based on experimental data and is a function of the spoil rate of its associated product P. For example, meats spoil more quickly than produce. This difference is accounted for in the shrink multiplier Q. Furthermore, as described above, an ideal storage temperature TI is associated with each product P. The product mixes for each case C are determined at step 420 and are generally given as follows:

$$C_i[P_1\%, P_2\%, \ldots, P_j\%]$$

Using the product mix values, a weighted average is determined for both the shrink multiplier Q, and the ideal temperature TI, at steps 430 and 440, respectively, as follows:

| Shrink Multiplier Q: |
|---|
| $Q_{1AVG} = Q_1 P_1\% + Q_2 P_2\% + \ldots + Q_j P_j\%$ |
| $Q_{2AVG} = Q_1 P_1\% + Q_2 P_2\% + \ldots + Q_j P_j\%$ |
| $Q_{iAVG} = Q_1 P_1\% + Q_2 P_2\% + \ldots + Q_j P_j\%$ |
| Ideal Temperature TI: |
| $TI_{1AVG} = TI_1 P_1\% + TI_2 P_2\% + \ldots + TI_j P_j\%$ |
| $TI_{2AVG} = TI_1 P_1\% + TI_2 P_2\% + \ldots + TI_j P_j\%$ |
| $TI_{iAVG} = TI_1 P_1\% + TI_2 P_2\% + \ldots + TI_j P_j\%$ |

Using the average temperature $T_{AVG}$, calculated at step 410, the average shrink multiplier $Q_{AVG}$, calculated at step 430 and the average ideal temperature $TI_{AVG}$, calculated at step 440, a quality factor QF is determined for each case. The quality factor QF is determined at step 450, using the following logic:

For $n=1$ to $i$: If $(T_{nAVG} > TI_{nAVG})$ then $QF_n = (T_{nAVG} - TI_{nAVG}) Q_{nAVG}$, else $QF_n = 0$ As a result, quality factors $QF_1$, $QF_2$, to $QF_i$ are calculated.

Having determined the quality factors for each case C of the refrigeration system, secondary parameters B and R are subsequently calculated at step 460. As before, secondary parameter B is equal to the number of cases having a quality factor greater than zero and R is equal to the sum of all of the quality factors greater than zero. At step 470, secondary parameters B and R are used to calculate the average quality factor $QF_{AVG}$, as follows:

$$QF_{AVG} = R/B$$

At step 480, the maximum quality factor $QF_{MAX}$ is determined as follows:

$$QF_{MAX} = MAX(QF_1, QF_2, \ldots QF_i)$$

Using the average quality factor $QF_{AVG}$ and the maximum quality factor $QF_{MAX}$, an unscaled FQI is calculated at step 490 as follows:

$$FQI_{UNSCALED} = SQRT[(QF_{MAX})^2 + (QF_{AVG})^2]$$

A least squares averaging technique is used to limit the impact of either the $QF_{AVG}$ or $QF_{MAX}$ values that would otherwise affect judgment about how overall product quality decreases from the combination of the values.

Finally, at step 500, $FQI_{UNSCALED}$ is scaled between 0 and 100 as follows:

$$FQI_{SCALED} = 100[(1 - FQI_{UNSCALED})/FQI_{MAX}]$$

$FQI_{MAX}$ is equal to the FQI for all $T_{MAX} = 51°$ F., which is again deemed the worst case. The FQI enables a store to increase the shelf-life of its perishable food products resulting in increased customer satisfaction and cost savings.

In a first preferred embodiment, the temperature measurements for either the FSI or FQI calculation are achieved using a hand-held infra-red temperature sensor measurement device 100 such as an IR-temperature gun (see FIG. 2) commonly known in the art during an "audit" process. It is anticipated that the gun 100 will measure the temperatures of a sample of each product group and determine the average, minimum and maximum temperature values. In this manner, only one audit process is required to calculate both FSI and FQI. The audit process preferably occurs regularly (i.e., yearly, monthly, weekly, daily, etc.).

In the exemplary embodiment of the present invention a remote computer system 110 is preferably programmable with information including, but not limited to, safety multipliers SF, shrink multipliers S and Q, ideal temperatures TI and product mix percentages P%. The computer system 110 preferably includes a processing unit 112, an input device 114 such as a keyboard, scanner or the like, a memory 116 and an output device 118 such as a monitor, printer or the like. The temperature information is input into the computer system 110 using the input device 114 and the computer system 110 calculates the indices according to the methods of the present invention, storing the results of the calculation in the memory 116. The results of the calculations are read or printed from the output device 118.

In an alternative embodiment, continuous food product temperature measurement is achieved real-time, as opposed to an audit process. For example, a food product simulator 50 (see FIG. 2) may be disposed in each refrigerator case 22 ($C_i$) for each food product group ($P_j$) within the refrigerator case 22 ($C_i$). A detailed description of the food product simulator 50 is provided in co-pending application Ser. No. 09/564,173, filed on May 3, 2000, with the United States Patent and Trademark Office, entitled "Wireless Method And Apparatus For Monitoring And Controlling Food Temperature," hereby incorporated by reference. The product group temperature samples are read by the controller 30 and are continuously monitored during a "monitor" process. It is anticipated that at least one simulator 50 will be present for each product group ($P_j$) in a particular case 22 ($C_i$). The monitor process may record temperature values at a predetermined rate (i.e. every 10 minutes, hour, day, etc.) that is operator programmable into the controller, or real-time. The implementation of a food product simulator is exemplary in nature and it is anticipated that other products and methods can be used to achieve real-time or periodic sampling within the scope of the invention.

It is also anticipated that the controller 30 having received the temperature readings during the monitor process may perform the calculations of the present method to determine FSI and/or FQI. To achieve this, the controller 30 is programmable with instructions to execute algorithms according to the methods discussed above and information including, but not limited to, safety multipliers S, shrink multipliers S and Q, ideal temperatures TI and product mix percentages P%. These values are storable within a memory 120 of the controller 30 and may be changed by an operator. FSI and FQI values can be calculated for any given period of time as desired by an operator.

Alternatively, it is foreseen that the controller 30 may relay information to the computer system 110 via a link 122 (e.g., network, infra-red, radio frequency, etc.), whereby the computer system 110 performs the calculations of FSI and FQI values. Again, the computer system 110 would require the additional information of shrink multipliers S and Q, ideal temperatures TI and product mix percentages P% to be input and stored into the memory 116.

Once the FSI and FQI calculations have been determined, by either the audit or monitoring processes, the FSI and FQI values and any other information, may be relayed to a central database 130 via the internet, an intranet, a local network or any other data transfer/communication means known in the art. A centralized "quality and safety" database can store information for different store locations, compiling, comparing and contrasting the information between each, and display this information through any output device (e.g., monitor, printer, etc.) database accessed remotely. In this manner, FSI and FQI data may be gathered and evaluated for the food product industry as a whole, a particular chain of stores, particular stores within each chain of stores, particular departments within each store (e.g., deli, produce, dairy, meat, etc.) and even particular refrigeration cases 22 within each department. The indices enable performance evaluation to enhance overall food product management within the food product industry. For example, a particular store's food safety and quality management performance may be compared with other stores within the chain or with the industry as a whole, to determine how that particular store is performing and whether actions to improve performance are required.

Figure 5:
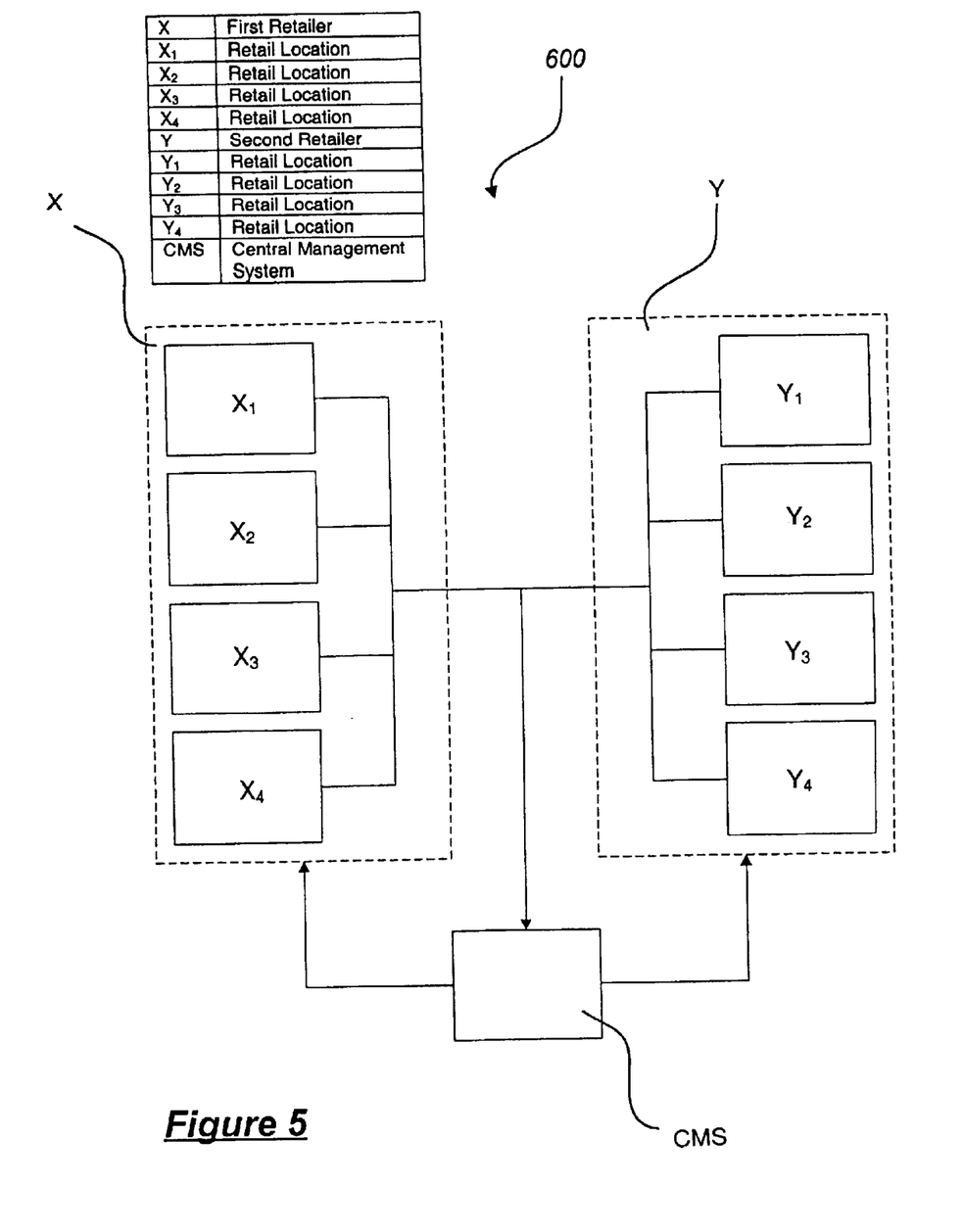
FIG. 5 is a schematic view of a food characteristic management system according to the principles of the present invention.

With reference to Figure 5, an exemplary food characteristic management system 600 is shown. The food characteristic management system 600 includes at least first and second food managers or retailers X,Y, each comprising a plurality of food distribution locations $X_1$-$X_4$, $Y_1$-$Y_4$. A central management system OMS is further included and is in communication with each of the first and second retailers X,Y and each of the distribution locations, $X_1$-$X_4$, $Y_1$-$Y_4$. In an exemplary embodiment, each location $X_1$-$X_4$, $Y_1$-$Y_4$, of the first and second retailers calculates a food characteristic index, such as the hereindescribed ESI and/or EQI indices. The first and second food retailers X,Y forward the indice calculations to the central management system OMS. The central management system OMS may then utilize the information to analyze the food management performance of the first and second retailers X,Y and the individual distribution locations $X_1$-$X_4$, $Y_1$-$Y_4$. Furthermore, the central management system CMS may provide feedback to the first and second food retailers X,Y on performance, and/or advise the first and second food retailers X,Y on improving performance.

It is foreseen that the first and second food retailers X,Y may be a chain food retailer or alternatively the first and second food retailers may X,Y may be competitors within the food retail industry. Further, it is foreseen that the central management system CMS may be commonly owned and operated by either or both of the first and second food retailers X,Y or alternatively owned and operated by an independent contracting company.

The foregoing discussion discloses and describes merely exemplary embodiments of the present invention. One skilled in the art will readily recognize from such discussion, and from the accompanying drawings and claims that various changes, modifications and variations can be made therein without departing from the spirit and scope of the invention.

What is claimed is:

1. A method for determining a food product index for a plurality of product types contained within a plurality of refrigeration cases, said method comprising the steps of:

measuring a first parameter of each of the plurality of product types within the plurality of refrigeration cases;

determining a second parameter for each of the plurality of refrigeration cases as a function of said first parameter;

determining a third parameter for each of the plurality of refrigeration cases;

determining a first parameter threshold value for each of the plurality of product types;

calculating a first factor for each of the plurality of refrigeration cases as a function of said second parameter, said third parameter and said first parameter threshold value;

calculating an average value of said first factors of the plurality of refrigeration cases;

determining a maximum value of said first factors of the plurality of refrigeration cases; and calculating the food product index as a function of said maximum value and said average value of said first factors.

2. The method of claim 1, wherein said first parameter is temperature.

3. The method of claim 1, wherein said second parameter is calculated as the maximum value of said first parameter for each of said plurality of refrigeration cases.

4. The method of claim 1, wherein said third parameter is a multiplier.

5. The method of claim 4, wherein said multiplier is a maximum among a group of multipliers, each member of said group associated with one of said plurality of product types.

6. The method of claim 5, wherein said sub-multipliers are pre-defined and experimentally confirmed for each of the plurality of product types.

7. The method of claim 1, wherein said first parameter threshold value is common to each of the plurality of product types.

8. The method of claim 7, wherein said first parameter threshold value is a temperature threshold value equal to 41° F.

9. The method of claim 1, wherein said first factor is a safety factor and calculating said safety factor for each of the plurality of refrigeration cases includes the steps of:
comparing said second parameter for each of the plurality of refrigeration cases to said first parameter threshold value;
wherein said safety factor is a difference between said second parameter and said first parameter threshold value multiplied by said third parameter, for each of the plurality of refrigeration cases if said comparison yields a first result; and
wherein said safety factor is equal to zero if said comparison yields a second result.

10. The method of claim 9, wherein said first result exists if said second parameter is greater than said first parameter threshold value.

11. The method of claim 9, wherein said second result exists if said second parameter is one of either less than or equal to said first parameter threshold value.

12. The method of claim 1, wherein calculation of the food product index includes the steps of:
calculating an unscaled food product index;
calculating a maximum food product index; and
calculating said food product index as a function of said unscaled food product index and said maximum food product index.

13. The method of claim 12, wherein said unscaled food product index is determined from a root-mean-square calculation of said maximum value of said first factors and said average value of said first factors.

14. The method of claim 1, wherein said second parameter is calculated as the average value of said first parameter for each of said plurality of refrigeration cases.

15. The method of claim 1, wherein said first parameter threshold value is an ideal temperature for storing a particular product type.

16. The method of claim 1, wherein said first factor is a quality factor and calculating said quality factor for each of the plurality of refrigeration cases includes the steps of:
comparing said second parameter for each of the plurality of refrigeration cases to an average first parameter threshold value;
wherein said quality factor is a difference between said second parameter and said average first parameter threshold value multiplied by said third parameter, for each of the plurality of refrigeration cases if said comparison yields a first result; and
wherein said quality factor is equal to zero if said comparison yields a second result.

17. The method of claim 16, wherein said third parameter is an average multiplier and calculation of said third parameter includes the steps of:
determining a multiplier for each of the product types in each of the plurality of refrigeration cases;
determining a product mix percentage for each of the product types in each of the plurality of refrigeration cases; and
calculating an average multiplier for each of the plurality of refrigeration cases as a function of said multiplier and said product mix percentage for each of the product types.

18. The method of claim 16, wherein calculating said average first parameter threshold value includes the steps of:
determining a product mix percentage for each of the product types in each of the plurality of refrigeration cases; and
calculating said average first parameter threshold value for each of the plurality of refrigeration cases as a function of said first parameter threshold values and said product mix percentage for each of the product types.

19. The method of claim 16, wherein said first result exists if said second parameter is greater than said first parameter threshold value.

20. The method of claim 16, wherein said second result exists if said second parameter is one of either less than or equal to said first parameter threshold value.

21. An audit method for determining a food product index for a plurality of product types contained within a plurality of refrigeration cases, said audit method comprising the steps of:
measuring a first parameter of a sample of each of the plurality of product types within the plurality of refrigeration cases;
determining a second parameter for each of the plurality of refrigeration cases as a function of said first parameter;
determining a third parameter for each of the plurality of refrigeration cases;
determining a first parameter threshold value for each of the plurality of product types;
calculating a first factor for each of the plurality of refrigeration cases as a function of said second parameter, said third parameter and said first parameter threshold value;
calculating an average value of said first factors of the plurality of refrigeration cases;
determining a maximum value of said first factors of the plurality of refrigeration cases; and
calculating the food product index as a function of said maximum value and said average value of said first factors.

22. The method of claim 21, wherein said first parameter is temperature.

23. The method of claim 22, wherein said first parameter is measured using a temperature sensor.

24. A monitoring method for determining a food product index for a plurality of product types contained within a plurality of refrigeration cases, said monitoring method comprising the steps of:
monitoring a first parameter of a plurality of food product simulators within the plurality of refrigeration cases;
determining a second parameter for each of the plurality of refrigeration cases as a function of said first parameter;
determining a third parameter for each of the plurality of refrigeration cases;
determining a first parameter threshold value for each of the plurality of product types;
calculating a first factor for each of the plurality of refrigeration cases as a function of said second parameter, said third parameter and said first parameter threshold value;
calculating an average value of said first factors of the plurality of refrigeration cases;

determining a maximum value of said first factors of the plurality of refrigeration cases; and calculating the food product index as a function of said maximum value and said average value of said first factors.

25. The method of claim 24, wherein said first parameter is temperature.

26. The method of claim 24, wherein the step of monitoring said first parameter includes continuously monitoring said first parameter.

27. The method of claim 26, wherein said step of monitoring said first parameter includes a product simulator to monitor said first parameter.

28. The method of claim 24, further comprising a step of communicating said first parameter from said food product simulator to a controller of the refrigeration system.

29. A system for refrigerating a plurality of food products and determining a food product index, the system comprising:

at least one refrigeration case;

at least one product temperature sensor disposed within said at least one refrigeration case and operable to measure a product temperature from said at least one refrigeration case; and a controller in communication with said at least one product temperature sensor and operable to continuously receive temperature data for calculating a food characteristic index.

30. The system of claim 29, wherein calculation of the food characteristic index includes the steps of:

monitoring a first parameter of said at least one product temperature sensor within the plurality of refrigeration cases;

determining a second parameter for each of the plurality of refrigeration cases as a function of said first parameter;

determining a third parameter for each of the plurality of refrigeration cases;

determining a first parameter threshold value for each of the plurality of product types;

calculating a first factor for each of the plurality of refrigeration cases as a function of said second parameter, said third parameter and said first parameter threshold value;

calculating an average value of said first factors of the plurality of refrigeration cases;

determining a maximum value of said first factors of the plurality of refrigeration cases; and calculating the food characteristic index as a function of said maximum value and said average value of said first factors.

31. The system of claim 30, wherein said first parameter is temperature.

32. The system of claim 29, wherein said at least one product temperature sensor is a simulated product temperature sensor.

33. A method for evaluating food characteristic management performance of a food manager, comprising the steps of:

collecting first product data from a first food manager;

determining a first food characteristic index as a function of said first product data for said first food manager;

collecting second product data from a second food manager;

determining a second food characteristic index as a function of said second product data for said second food manager; and comparing said first food characteristic index and said second food characteristic index.

34. The method of claim 33, advising one of said first and second food managers to improve food characteristic management as a function of said comparing said first food characteristic index and said second food characteristic index.

35. The method of claim 33, further comprising the step of:

adjusting performance of one of said first and second food managers as a function of said comparing of said first and second food characteristic indices.

36. The method of claim 33, wherein said steps of collecting first and second food product data includes collecting product data representing a plurality of product types.

37. The method of claim 33, wherein calculating said first food characteristic index comprises the steps of:

measuring a first parameter of each of a plurality of product types within a plurality of refrigeration cases;

determining a second parameter for each of said plurality of refrigeration cases as a function of said first parameter;

determining a third parameter for each of said plurality of refrigeration cases;

determining a first parameter threshold value for each of said plurality of product types;

calculating a first factor for each of said plurality of refrigeration cases as a function of said second parameter, said third parameter and said first parameter threshold value;

calculating an average value of said first factors of the plurality of refrigeration cases;

determining a maximum value of said first factors of said plurality of refrigeration cases; and calculating said first food characteristic index as a function of said maximum value and said average value of said first factors.

38. The method of claim 33, wherein calculating said second food characteristic index comprises the steps of:

measuring a first parameter of each of a plurality of product types within a plurality of refrigeration cases;

determining a second parameter for each of said plurality of refrigeration cases as a function of said first parameter;

determining a third parameter for each of said plurality of refrigeration cases;

determining a first parameter threshold value for each of said plurality of product types;

calculating a first factor for each of said plurality of refrigeration cases as a function of said second parameter, said third parameter and said first parameter threshold value;

calculating an average value of said first factors of said plurality of refrigeration cases;

determining a maximum value of said first factors of said plurality of refrigeration cases; and calculating said second food characteristic index as a function of said maximum value and said average value of said first factors.

39. The method of claim 33, wherein said first and second food characteristic indices are food quality indices.

40. The method of claim 33, wherein said first and second food characteristic indices are food safety indices.

41. The method of claim 33, wherein said first food manager comprises a chain of food product retailers.

42. The method of claim 33, wherein said first food manager comprises a food product retailer within a chain of food product retailers.

43. The method of claim 33, wherein said first food manager comprises a food product department within a food product retailer.

44. The method of claim 33, wherein said first food manager comprises a food product storage case within a department of a food product retailer.

45. The method of claim 33, wherein said second food manager comprises a chain of food product retailers.

46. The method of claim 33, wherein said second food manager comprises a food product retailer within a chain of food product retailers.

47. The method of claim 33, wherein said second food manager comprises a food product department within a food product retailer.

48. The method of claim 33, wherein said second food manager comprises a food product storage case within a department of a food product retailer.

49. The method of claim 33, further comprising the step of:

determining a food characteristic index for a food product industry, as a function of said first and second food characteristic indices.

50. The method of claim 49, further comprising the step of:

comparing either of said first and second food characteristic indices of said first and second food managers with said food characteristic index for said food product industry.

* * * * *

UNITED STATES PATENT AND TRADEMARK OFFICE
CERTIFICATE OF CORRECTION

PATENT NO. : 6,609,078 B2
DATED : August 19, 2003
INVENTOR(S) : Neal Starling et al.

It is certified that error appears in the above-identified patent and that said Letters Patent is hereby corrected as shown below:

Column 2,
Line 61, "an" should be -- and --.

Column 7,
Line 63, "OMS" should be -- CMS --.

Column 8,
Line 1, "ESI and/or EQI" should be -- FSI and/or FQI --.
Lines 3 and 4, "OMS" should be -- CMS --.
Line 13, (first occurrence), after "retailers" delete "may".

Column 11,
Line 29, after "index" insert -- , indicating at least one of food safety and food quality --.

Signed and Sealed this

Sixth Day of July, 2004

JON W. DUDAS
*Acting Director of the United States Patent and Trademark Office*